(12) United States Patent
Irie et al.

(10) Patent No.: US 9,280,830 B2
(45) Date of Patent: Mar. 8, 2016

(54) IMAGE PROCESSING APPARATUS AND SEGMENTATION METHOD

(71) Applicant: OMRON Corporation, Kyoto-shi, Kyoto (JP)

(72) Inventors: Atsushi Irie, Nara (JP); Hiromatsu Aoki, Suita (JP); Takahiro Sato, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/613,967

(22) Filed: Feb. 4, 2015

(65) Prior Publication Data

US 2015/0262368 A1    Sep. 17, 2015

(30) Foreign Application Priority Data

Mar. 14, 2014 (JP) ................................. 2014-051625

(51) Int. Cl.
| | | |
|---|---|---|
| G06T 7/00 | (2006.01) | |
| G06K 9/00 | (2006.01) | |
| G06K 9/34 | (2006.01) | |

(52) U.S. Cl.
CPC .......... *G06T 7/0079* (2013.01); *G06K 9/00228* (2013.01); *G06K 9/00362* (2013.01); *G06K 9/34* (2013.01); *G06T 7/0081* (2013.01); *G06T 7/0097* (2013.01); *G06T 2207/10016* (2013.01); *G06T 2207/20144* (2013.01); *G06T 2207/30201* (2013.01)

(58) Field of Classification Search
None
See application file for complete search history.

(56) References Cited

U.S. PATENT DOCUMENTS

| 8,913,830 B2* | 12/2014 | Sun | G06K 9/342 |
| | | | 382/164 |
| 2013/0064425 A1 | 3/2013 | Sagawa et al. | |
| 2013/0094725 A1* | 4/2013 | Gulsun | G06T 7/0083 |
| | | | 382/128 |
| 2015/0077323 A1* | 3/2015 | Ramaswamy | G06F 3/012 |
| | | | 345/156 |

FOREIGN PATENT DOCUMENTS

JP    2000-048212 A    2/2000

OTHER PUBLICATIONS

Al-Qunaieer et al., "Multi-Resolution Level Set Image Segmentation Using Wavelets", 2011 IEEE, 18th IEEE International Conference, pp. 273-276 (4 pages).
Extended European Search Report issued in corresponding European Application No. 15150956.9, mailed on Jul. 31, 2015 (8 pages).
Mahmoud Ramze Rezaee, et al.; "A Multiresolution Image Segmentation Technique Based on Pyramidal Segmentation and Fuzzy Clustering"; IEEE Transations on Image Processing, IEEE Service Center; Piscata Way, NJ, vol. 9, No. 7; Jul. 1, 2000; XP011025624 (11 pages).

* cited by examiner

*Primary Examiner* — Sean Motsinger
(74) *Attorney, Agent, or Firm* — Osha Liang LLP

(57) ABSTRACT

An image processing apparatus for extracting an area of a detection target from an image includes an image input section that acquires an image, an image generation section that generates a plurality of images with different resolutions from the image, and a segmentation section that performs segmentation using the plurality of images with the different resolutions. The segmentation section segments an image with a low resolution and then segmenting an image with a high resolution using, as a processing target area, an area in the image with the high resolution corresponding to an area near a boundary resulting from processing of the segmentation of the image with the low resolution.

8 Claims, 7 Drawing Sheets

HUMAN BODY IMAGE
(ORIGINAL IMAGE)

INPUT IMAGE

FIRST IMAGE

SET MASK AREA BASED ON HUMAN-BODY DETECTION RESULT

SEGMENTATION PROCESSING RESULT FOR FIRST IMAGE

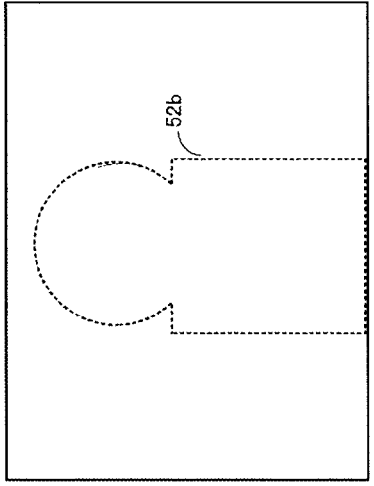
FIG. 7C
ENLARGE AREA BOUNDARY IN FIRST IMAGE
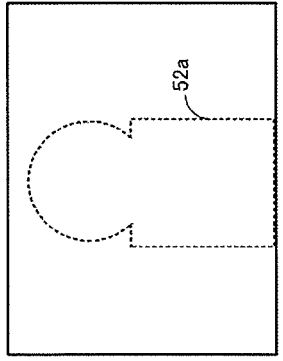
FIG. 7B
AREA BOUNDARY IN FIRST IMAGE
FIG. 7A
SECOND IMAGE
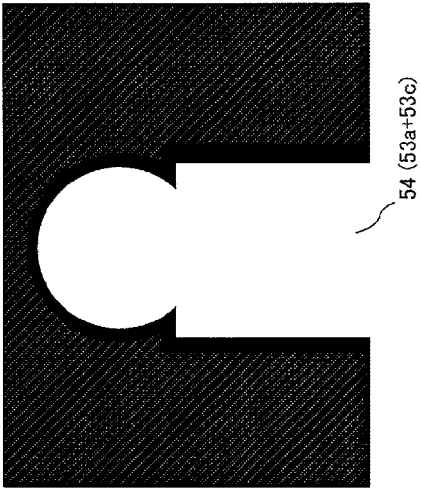
FIG. 7D
SET MASK AREA TO BE PERIPHERY OF ENLARGED BOUNDARY
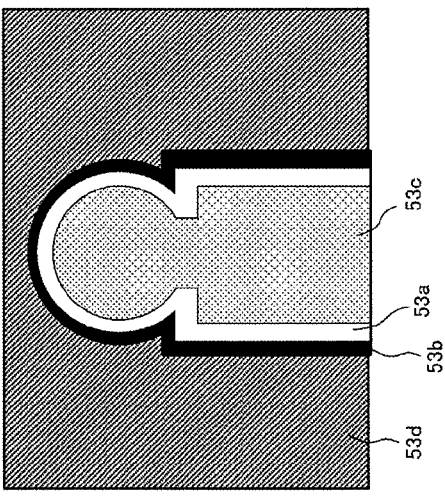
FIG. 7E
EXECUTE SEGMENTATION PROCESSING ON MASK AREA
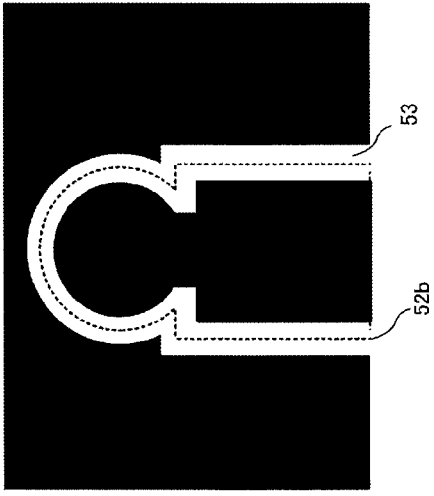
FIG. 7F
SEGMENTATION PROCESSING RESULT FOR SECOND IMAGE

IMAGE PROCESSING APPARATUS AND SEGMENTATION METHOD

CROSS REFERENCE TO RELATED APPLICATION

This application claims the benefit of Japanese Patent Application No. 2014-051625, filed on Mar. 14, 2014, which is hereby incorporated by reference herein in its entirety.

BACKGROUND OF THE INVENTION

1. Field of the Invention

The present invention relates to a technique for extracting a desired area from an image.

2. Description of the Related Art

A technique called segmentation is known which separates a given image into a foreground (a portion to be extracted) and a background (the remaining portion) by means of digital image processing using a computer.

Quick and accurate segmentation is desired for a segmentation process. According to Patent Literature 1, the resolution of an image is set to be coarse initially and then enhanced gradually in accordance with the increasing number of updating a contour line. In this case, when the contour line is updated, new contour points are determined based on a rectangular area having a predetermined width and centered at a segment with which a reference point in an area in the image and a contour point are connected together.

In Non Patent Literature 1, a plurality of images with respective resolutions are prepared and segmented in order starting with an image with the lowest resolution. In Non Patent Literature 1, the level set algorithm is used. The level set processing can be quickly converged by using the result of processing of an image with a low resolution as an initial contour line for an image with the next resolution. Moreover, in this document processing speed is increased by using an image subjected to wavelet conversion as a target image for segmentation.

CITATION LIST

Patent Literature

Patent Literature 1: Japanese Patent Application Laid-open No. 2000-48212

Non Patent Literature

Non Patent Literature 1: "Multi-resolution level set image segmentation using wavelets" by Al-Qunaieer, Fares S., Hamid R. Tizhoosh, and Shahryar Rahnamayan in ImageProcessing (ICIP), 2011 18th IEEE International Conference on. IEEE, 2011

SUMMARY OF THE INVENTION

Both the above-described conventional techniques execute the segmentation process using the entire image as a processing target. Thus, high processing costs are needed, and an incorrect area may be extracted.

One or more embodiments of the present invention provides a segmentation technique that is quicker and more accurate than the conventional techniques.

According to one or more embodiments of the present invention, an image with a low resolution is segmented. Then, an image with a high resolution is segmented using an area near a boundary resulting from processing of the segmentation of the low resolution image as a processing target area.

Specifically, an image processing apparatus according to one or more embodiments of the present invention extracts an area of a detection target from an image, the apparatus including: an image input section configured to acquire an image; an image generation section configured to generate a plurality of images with different resolutions from the image; and a segmentation section configured to perform segmentation using the plurality of images with the different resolutions, the segmentation section segmenting an image with a low resolution and then segmenting an image with a high resolution, using, as a processing target area, an area in the image with the high resolution corresponding to an area near a boundary resulting from processing of the segmentation of the image with the low resolution.

More specifically, in one or more embodiments of the present invention, when the plurality of images with the different resolutions are set to be first to Nth images (N is a natural number of 2 or more) in order of increasing resolution, the segmentation section segments an ith image (i is a natural number of 1 to N−1) and then segments an i+1th image, using, as a processing target area, an area in the i+1th image corresponding to an area near a boundary resulting from processing of the segmentation of the ith image, and starts segmentation of the first image and outputs the processing result of segmentation of the Nth image as the processing result of final segmentation.

In this configuration, when the image with the low resolution is first segmented and the image with the high resolution is then segmented using the processing result for the image with the low resolution, the processing target area is limited. Thus, the processing speed can be increased. Furthermore, segmenting the image with the low resolution first allows candidate areas (that is, areas expected to include an area to be treated as a foreground) to be efficiently limited. Consequently, when the image with the high resolution is segmented, areas to be segmented can be limited. As a result, erroneous extractions are reduced to allow accurate segmentation to be achieved.

Furthermore, according to one or more embodiments of the present invention, the apparatus further includes a detection section configured to detect the detection target in the image acquired by the image input section, and the segmentation section determines the processing target area for segmentation of the first image based on a position of the detection target detected by the detection section. Thus, the processing speed and accuracy can further be increased. The entire area of the first image may be segmented without detection of the target.

Additionally, according to one or more embodiments of the present invention, the segmentation section divides the image into a foreground and a background, and in segmentation process on the ith image, determines a foreground area in the ith image to be an area resulting from summation of an area determined to the foreground in the processing target area and an area inside the processing target. Thus, segmentation allows division into the foreground and the background.

In addition, in one or more embodiments of the present invention, the area in the image with the high resolution corresponding to the area near the boundary in the processing result of segmentation is an area within a range of a predetermined number of pixels from a position in the image with the high resolution corresponding to the boundary in the processing result of segmentation of the image with the low resolution. Alternatively, the area in the image with the high resolution corresponding to the area near the boundary in the processing result of segmentation is an area in the image with the high resolution corresponding to an area within a range of a predetermined number of pixels from the boundary resulting from processing of the segmentation of the image with the low resolution. The predetermined number of pixels may vary in accordance with the resolution of the image or may be the same for all the images with the different resolutions.

Furthermore, in one or more embodiments of the present invention, the plurality of images with the different resolutions generated by the image generation section may be images having lower resolutions than the image acquired by the image input section. The level of the resolutions of the generated images is not particularly the limited. Furthermore, the input image (an image with the same resolution as the resolution of the input image) itself may be included in the images to be processed by the segmentation section.

Additionally, one or more of the above-described embodiments may be combined together.

One or more embodiments of the present invention allows the segmentation process to be executed more quickly and accurately than in the conventional techniques.

BRIEF DESCRIPTION OF THE DRAWINGS

FIGS. 7A-7F are diagrams illustrating the segmentation process.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. An image processing apparatus 100 according to one or more embodiments of the present invention acquires an image via a network or a storage medium and executes various types of image processing including a segmentation process on the image. In one or more embodiments of the present invention, the image processing apparatus 100 will be described which is intended specifically for a segmentation process for extracting the area of a human body from an image.

(Configuration)

Figure 2:
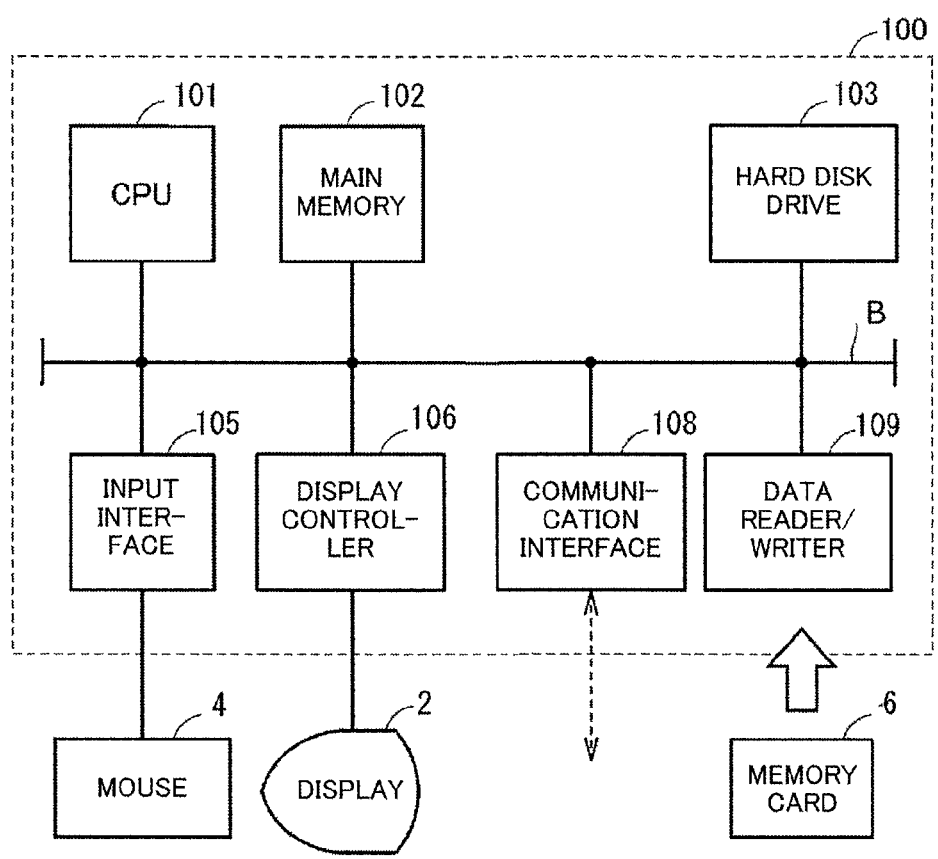
FIG. 2 is a diagram depicting a hardware configuration of the image processing apparatus.

FIG. 2 is a schematic diagram of the image processing apparatus 100 according to one or more embodiments of the present invention. As depicted in FIG. 2, the image processing apparatus 100 includes a central processing unit (CPU) 101 that is an arithmetic processing section, a main memory 102 and a hard disk drive (HDD) 103 which correspond to a memory section, an input interface 105, a display controller 106, a communication interface 108, and a data reader/writer 109. These sections are connected together via a bus B so as to be able to communicate with one another.

The CPU 101 executes various calculations by expanding computer programs (code) stored in the HDD 103 into the main memory 102 and executing the programs in a predetermined order. The main memory 102 is typically a volatile storage apparatus such as a dynamic random access memory (DRAM) which holds, in addition to programs read from the HDD 103, for example, image data loaded from the communication interface 108 and the data reader/writer 109. Moreover, the HDD 103 may store various set values and the like. In addition to or instead of the HDD 103, a semiconductor storage apparatus such as a flash memory may be adopted.

The input interface 105 mediates data transmission between the CPU 101 and an input section such as a mouse 4, a keyboard, and a touch panel. That is, the input interface 105 receives operational instructions provided by the user operating the input section.

The display controller 106 is connected to a display 2 that is a typical example of a display apparatus and notifies a user of, for example, the result of image processing in the CPU 101. That is, the display controller 106 is connected to the display 2 to control display on the display 2.

The communication interface 108 mediates data transmission between the CPU 101 and any other computer. The communication interface 108 typically includes Ethernet (registered trademark) or Universal Serial Bus (USB). As described below, instead of a form in which a program stored in a memory card 6 is installed in the image processing apparatus 100, a form is possible in which a program downloaded from a distribution server or the like via the communication interface 108 is installed in the image processing apparatus 100.

The data reader/writer 109 mediates data transmission between the CPU 101 and the memory card 6, which is a storage medium. That is, the memory card 6 is distributed in which, for example, programs executed by the image processing apparatus 100 are stored, and the data reader/writer 109 reads the programs from the memory card 6. Furthermore, in response to internal instructions from the CPU 101, the data reader/writer 109 reads image data stored in the memory card 6 and stores image data generated by the image processing apparatus 100 in the memory card 6. The memory card 6 includes a general-purpose semiconductor storage device such as CompactFlash (CF) or Secure Digital (SD), a magnetic storage medium such as a flexible disk, or an optical storage medium such as compact disk read only memory (CD-ROM).

Furthermore, another output apparatus such as a printer may be connected to the image processing apparatus 100 when needed.

(Segmentation Process)

Figure 1:
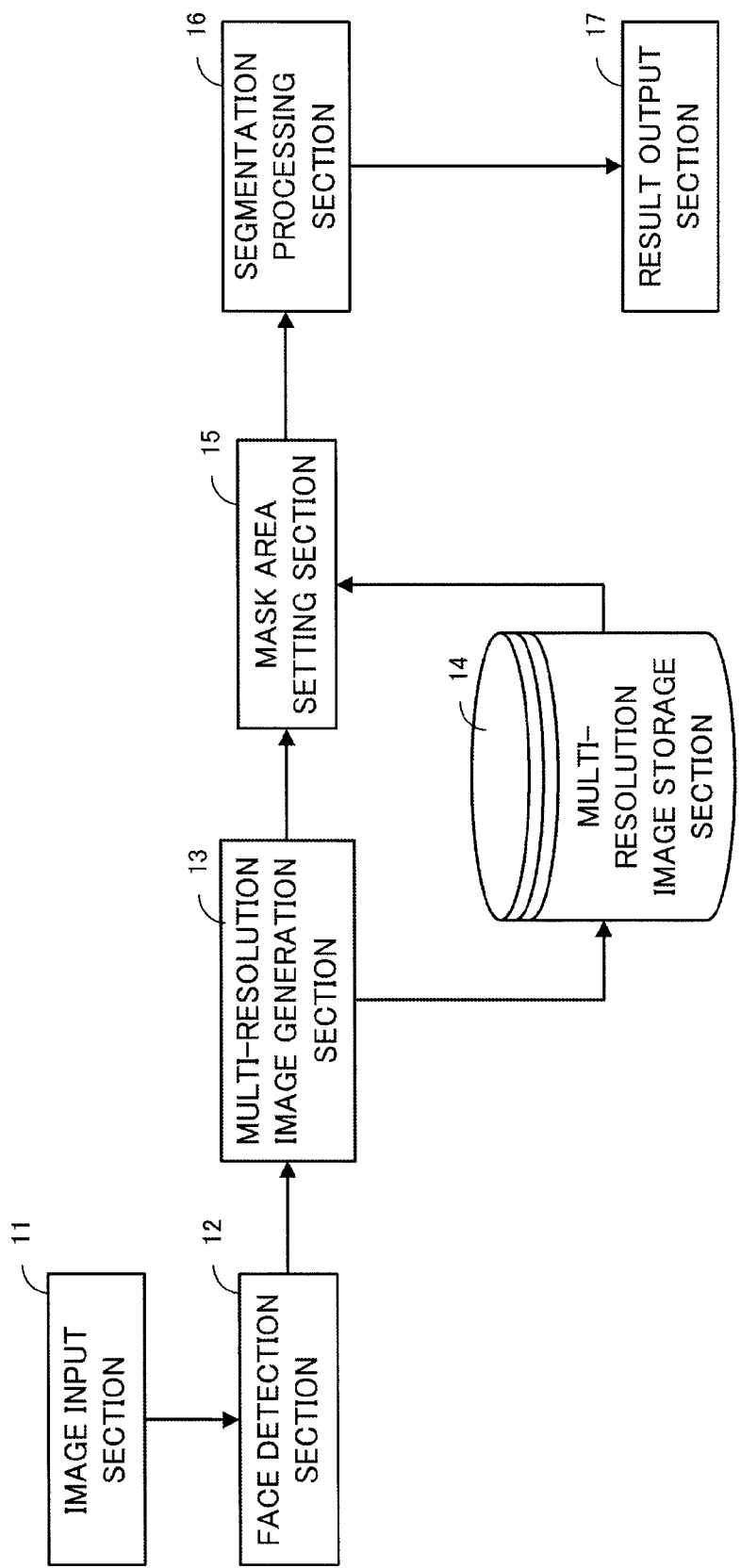
FIG. 1 is a diagram depicting functional blocks of an image processing apparatus.
Figure 3:
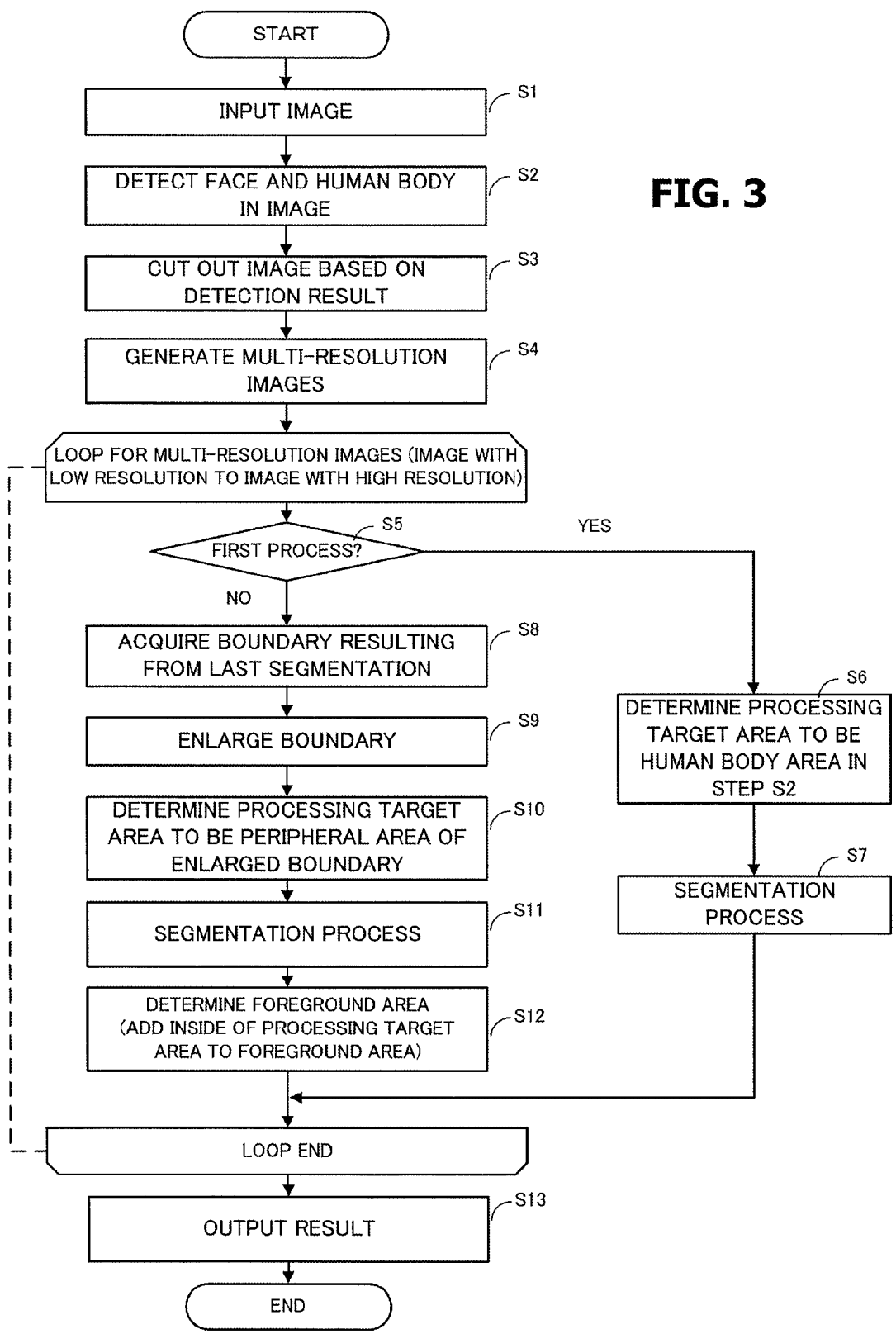
FIG. 3 is a flowchart depicting a flow of a segmentation process.

The functional blocks and process flow of the image processing apparatus 100 according to one or more embodiments of the present invention are depicted in FIG. 1 and FIG. 3. As described above, the CPU 101 of the image processing apparatus 100 executes pre-installed computer programs (OS and application programs) to implement functions depicted in FIG. 1. Some or all of the functions depicted in FIG. 1 may be implemented as dedicated hardware. The image processing apparatus 100 according to one or more embodiments of the present invention will be described below with reference to FIG. 1 and FIG. 3.

In step S1, the image input section 11 acquires image data (input image) intended for a segmentation process, from, for example, the communication interface or the memory card.

The image data intended for the segmentation process may be image data generated by the image processing apparatus 100.

Figure 4B:
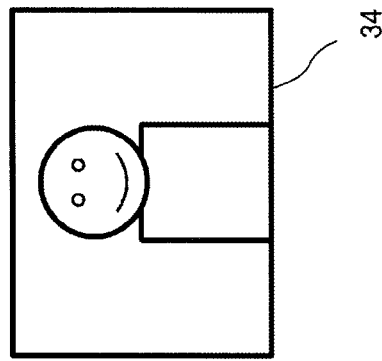
FIGS. 4A-4B are diagrams depicting an input image and a human image (original image)
Figure 4A:
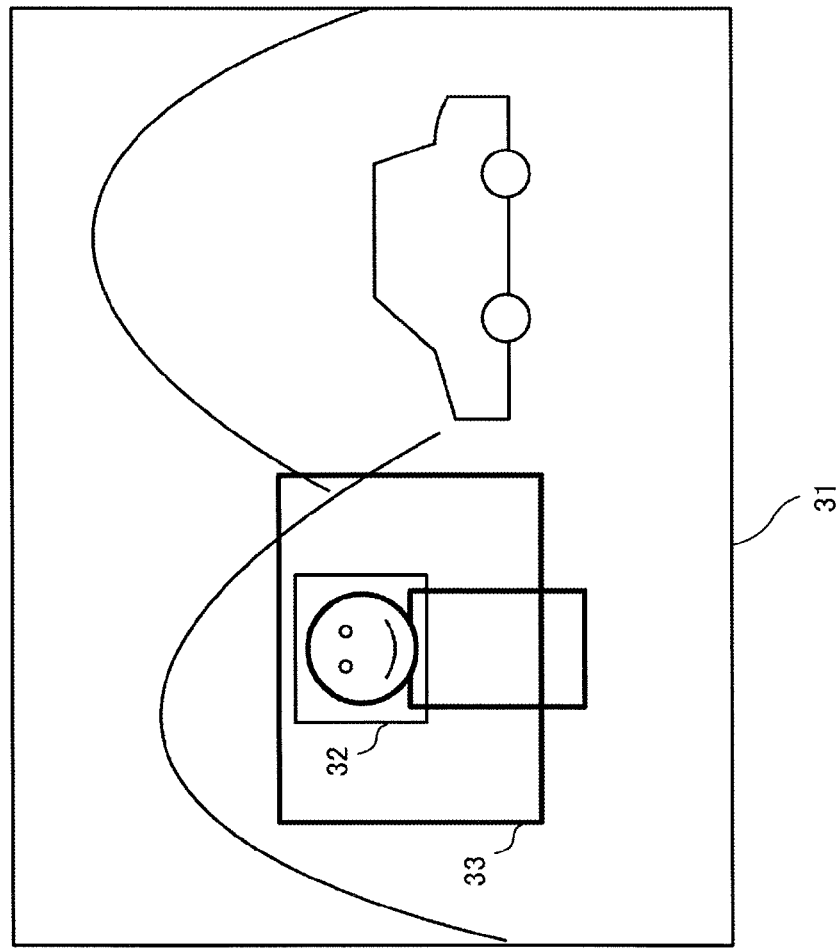

In step S2, a face detection section 12 detects a face in the image data acquired in step S1. The face detection process itself may be executed using any known technique. The result of the face detection allows determination of the area in which the image the face is present and further estimation of the area of a human body in the image based on the result. In step S3, an area including the area of the human body is cut out from the input image data. In the subsequent processing, the segmentation process is executed using the cutout image data as a processing target, and thus, the cutout image is hereinafter referred to as an original image. FIG. 4A depicts an example of the input image. A face area 32 is detected in an input image 31 by the face detection process. A human body area 33 is estimated based on the face area 32. In the cutout processing in step S2, the human body area 33 is cut out to provide an original image 34 depicted in FIG. 4B. The original image 34 is intended for the segmentation process. Thus, processing time can be shortened by cutting out the area with a human body present therein to reduce the size of the image.

In step S4, a multi-resolution image generation section 13 generates a plurality of images with different resolutions (image sizes) from the original image. The plurality of images generated is hereinafter generally referred to as multi-resolution images. The multi-resolution images are typically images having lower resolutions than the original image. However, an image having a higher resolution than the original image may be generated using super-resolution processing. The number and resolution of images generated may be appropriately determined. For example, a predetermined number of images may be generated which are half, quarter, . . . of the original image on a side. Alternatively, images may be generated without pre-fixation of the number of images generated, by sequentially halving the size of the image on a side until the size is equal to or smaller than a predetermined value. The size of each image need not necessarily be sequentially reduced to half, but the scale factor may be a fixed value other than ½ or vary in accordance with the size of the original image. For example, the size of an image with the lowest resolution and the number of images generated may be preset so that the scale factor for the low resolution processing may be appropriately determined based on the size and the number. The multi-resolution images generated by the multi-resolution image generation section 13 are stored in a multi-resolution image storage section 14. The original image itself is also included in the multi-resolution images.

Figure 5:
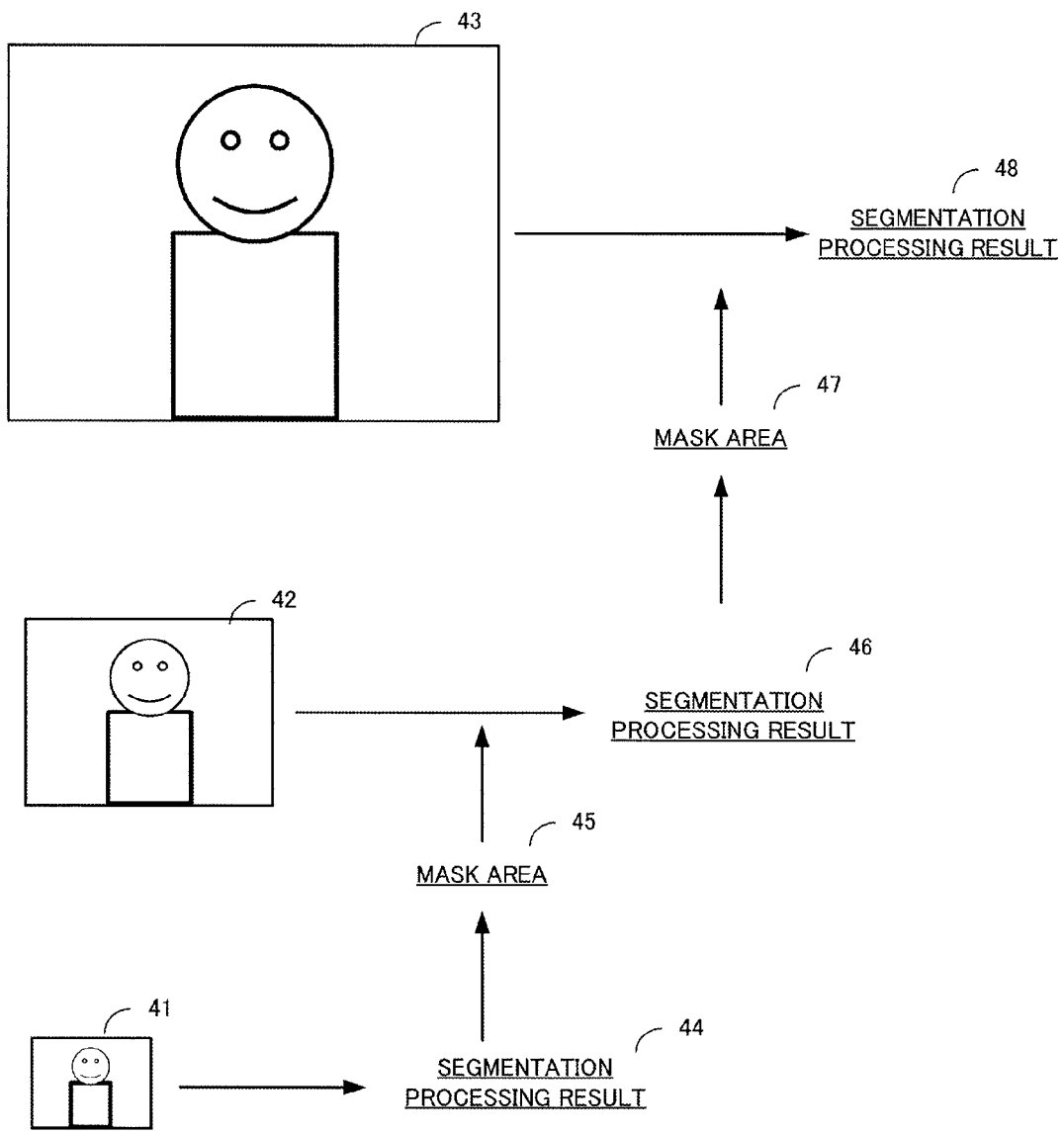
FIG. 5 is a diagram schematically illustrating a segmentation process.

The processing in steps S5 to S12 is executed in sequence in order of increasing resolution so that an image with the lowest resolution in the multi-resolution images is processed first. Repeated processing in steps S5 to S12 will be described in brief with reference to FIG. 5. The segmentation process is executed on an image with the lowest resolution 41. Then, based on result of the segmentation process 44, a processing target area (hereinafter referred to as a mask area) 45 for the segmentation process is determined for an image with the next higher resolution 42. The segmentation process is executed on the inside of the mask area 45 in the image 42. Then, based on the result of the segmentation process 46, a mask area 47 for an image with the next higher resolution 43 is determined. The segmentation process is executed on the inside of the mask area 47 in the image with the highest resolution 43 (typically the original image). The result of the segmentation process 48 is the final result of the segmentation process.

The repeated processing in steps S5 to S12 will be described in further detail. In the description below, the number of multi-resolution images is denoted by N (N is a natural number of 2 or more), and the images are hereinafter referred to as the ith image (i is a natural number of 1 to N) in order of increasing resolution. First, the segmentation process is started and executed on an image with the lowest resolution (first image).

Figure 6A:
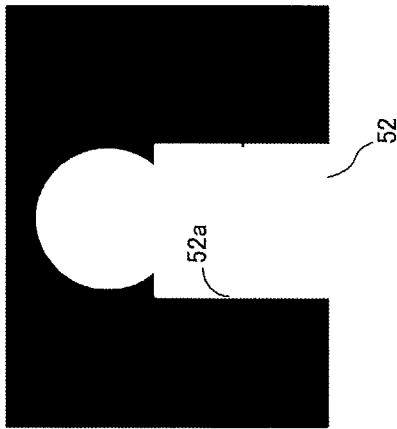
FIGS. 6A-6C are diagrams illustrating the segmentation process.
Figure 6B:
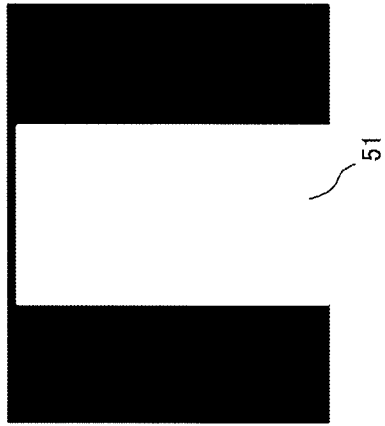

In step S5, whether or not the processing is the first processing, that is, processing executed on the image with the lowest resolution, is determined. When the processing is processing executed on the image with the lowest resolution (S5—YES), the processing proceeds to step S6. In step S6, a mask area setting section 15 sets a human body area estimated based on the result of face detection in step S2 to be a mask area in the first image. FIG. 6A and FIG. 6B depict the first image and the mask area 51 in the first image.

In step S7, the segmentation processing section (segmentation section) 16 executes the segmentation process on the mask area 51 in the first image. Any algorithm may be used for segmentation, but, according to one or more embodiments of the present invention, a contour-based algorithm is used in which an optimum boundary between a foreground and a background is searched for. For example, an algorithm such as graph cut or level set may be suitably utilized. In these algorithms, the foreground likelihood of colors of pixels inside the candidate area and the background likelihood of colors of pixels outside the candidate area are evaluated with respect to candidate solutions (candidate areas), whereby the optimum solution for the foreground area is searched for from among the plurality of candidate areas. These algorithms are well-known techniques and will thus not be described in detail.

Figure 6C:
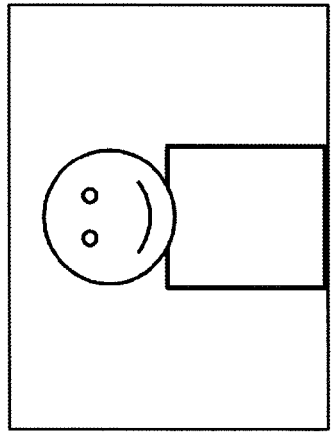

FIG. 6C depicts the result of the segmentation process on the first image. In FIG. 6C, the blank area (segmentation result 52) corresponds to the human body area (foreground), and the filled area is the background area. Thus, the processing on the first image is ended.

Then, a second image is processed. In the processing on the second and subsequent images, the determination in step S5 is negative, and the processing in steps S8 to S12 is executed. In step S8, the mask area setting section 15 acquires a boundary 52a from the last segmentation result (segmentation result 52 for the first image). The first image and the second image have different resolutions. Thus, in step S9, the mask area setting section 15 executes enlargement processing on the boundary 52a in accordance with the ratio between the resolution of the first image and the resolution of the second image to obtain a boundary 52a for the second image. The boundary 52b is an area in the second image corresponding to the boundary in the first image. FIG. 7A depicts the second image, and FIG. 7B depicts the boundary 52a included in the result of segmentation of the first image. FIG. 7C depicts the boundary 52b resulting from enlargement of the boundary 52a. Then, in step S10, the mask area setting section 15 determines a mask area 53 to be areas within ranges of a predetermined number of pixels inward and outward, respectively, from the boundary 52b. FIG. 7D depicts the mask area 53 (blank portion) for the second image.

The width of the mask area (the value of the predetermined number of pixels) may be a fixed value or a value varying in accordance with the resolution of the image to be processed (in this example, the second image). In this case, the width of the mask area may be gradually reduced with increasing resolution of the image. This is because repeated processing increases the accuracy of segmentation, allowing a narrower range to be segmented. In this case, the small width includes not only the meaning that the value (absolute number) of the predetermined number of pixels is small but also the meaning that the ratio (absolute number) of the value of the predetermined number of pixels to the resolution is low. Furthermore, in the above description, as the value of the predetermined number of pixels, the same value is set for the inside and outside of the boundary 52b. However, as the value of the predetermined number of pixels, different values may be set for the inside and outside of the boundary 52b.

When the mask area in the second image is determined to be an area in the second image corresponding to the area near the boundary resulting from the segmentation of the first image, a method different from the above-described method may be used for the determination. For example, the enlargement processing in step S9 may be replaced with the segmentation process based on the boundary in step S10 so that the area within the range of the predetermined number of pixels from the boundary 52a in the first image is set and enlarged in accordance with the ratio between the resolution of the first image and the resolution of the second image to obtain the mask area 53.

In step S11, the segmentation processing section 16 executes the segmentation process on the mask area 53 in the second image. FIG. 7D depicts the result of the segmentation in step S11. It is assumed that an area 53a in the mask area 53 is determined to be a human body area (foreground area) and that an area 53b in the mask area 53 is determined to be a background area. In the segmentation process in step S11, the areas other than the mask area 53 are not to be processed. However, the processing can use the result of the processing on the first image to determine the area 53c inside the mask area 53 to be the human body area (foreground), while determining the area 53d outside the mask area 53 to be the background area. Therefore, the segmentation processing section 16 determines the human body area (foreground) in the second image to be an area resulting from summation of the area 53a determined to be the human body area (foreground area) in step S11 and the area 53c inside the mask area (step S12). FIG. 7E depicts the result of segmentation of the resultant second image. As described above, the processing on the second image is ended. The processing in step S12 may not be executed on the images other than the image with the highest resolution. This is because, during the calculation, the processing can be achieved provided that the boundary between the foreground and the background can be determined.

The above-described processing is repeated a number of times equal to the number of multi-resolution images. That is, based on the result of segmentation of the ith image (i is a natural number of 1 to N−1), the segmentation process is executed on the i+1th image using the vicinity of the segmentation boundary as a processing target area. This is executed until the result of the segmentation process on the Nth image is obtained.

A result output section 17 outputs the result of the segmentation process on the Nth image as the final result of the segmentation process (step S13). The form of the output is not limited. For example, the output can be superimposed on the input image on the display or the like so as to enable the human body area to be distinguished. Alternatively, the output may be used as an input for any other processing in the image processing apparatus 100. For example, the output may be used as an input for cutout processing of cutting out the human body area. Alternatively, the output may be used as an input for background blurring processing of executing blurring processing on the background area.

As described above, according to one or more embodiments of the present invention, a plurality of images with different resolutions is prepared, and the segmentation process is executed on the images in order starting with an image with the lowest resolution. When the segmentation process is executed on an image with the next higher resolution, the segmentation target area is limited based on the result of segmentation of an image with the next lower resolution. Thus, when the segmentation process is executed on the image with the next higher resolution, the processing is carried out on the limited area rather than on the entire area, as a result the processing speed is increased. Moreover, since the segmentation process is executed on the images in order starting with the image with the lowest resolution, erroneous extractions are suppressed to allow accurate segmentation to be achieved.

(Variations)

The above-described embodiments are illustrative of specific examples of the present invention, and are not intended to limit the scope of the present invention to the specific examples.

For example, the segmentation process is executed by setting a mask area for the image with the lowest resolution (first image). However, for the first image, the entire area may be segmented. Furthermore, the cutout processing on the input image need not necessarily be executed.

Additionally, by way of example, the segmentation process has been described in which the human body, treated as the foreground, is distinguished from the background. However, the object to be detected may be any object. When the position or approximate area of the detection target can be determined based on feature quantities or the like or using template matching or the like, the cutout processing for the input image, setting of a mask area for the first image, and the like may be performed based on the detection result as is the case with one or more of the above-described embodiments. When the position or area of the detection target fails to be determined, the cutout processing and the setting of a mask area for the first image may be omitted.

In one or more of the above-described embodiments, the image processing apparatus has been described in which the software for image processing is installed in the general-purpose computer. However, an image processing engine configured using ASIC or FPGA may be incorporated into an imaging apparatus (camera) so as to execute the segmentation process on an image taken with the imaging apparatus. The segmentation method according to one or more embodiments of the present invention can be generally used as an element technology. Examples of the field of application include various types of digital image processing, an appearance inspection apparatus, computer vision, and machine vision.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

LIST OF REFERENCE NUMERALS

100 Image processing apparatus
11 Image input section
12 Face detection section
13 Multi-resolution image generation section
14 Multi-resolution image storage section
15 Mask area setting section
16 Segmentation processing section
17 Result output section

What is claimed is:

1. An image processing apparatus for extracting an area of a detection target from an image, comprising:
   an image input section that acquires an image;
   an image generation section that generates a plurality of images with different resolutions from the image; and
   a segmentation section that performs segmentation using the plurality of images with the different resolutions,
   wherein the segmentation section segments an image with a low resolution and then segmenting an image with a high resolution using a processing target area, and
   wherein the processing target area is only an area within a range of a predetermined number of pixels from a position in the image with the high resolution corresponding to an area near a boundary resulting from processing of the segmentation of the image with the low resolution, or only an area in the image with the high resolution corresponding to an area within a range of a predetermined number of pixels from the boundary resulting from the processing of segmentation of the image with the low resolution.

2. The image processing apparatus according to claim 1, wherein, when the plurality of images with the different resolutions are set to be first to Nth images, where N is a natural number of 2 or more, in order of increasing resolution:
   the segmentation section segments an ith image, where i is a natural number of 1 to N−1, and then segments an i+1th image, using, as a processing target area, an area in the i+1th image corresponding to an area near a boundary resulting from processing of the segmentation of the ith image, and
   starts segmentation of the first image and outputs the processing result of segmentation of the Nth image as the processing result of final segmentation.

3. The image processing apparatus according to claim 2, further comprising:
   a detection section that detects the detection target in the image acquired by the image input section,
   wherein the segmentation section determines the processing target area for segmentation of the first image based on a position of the detection target detected by the detection section.

4. The image processing apparatus according to claim 2, wherein the segmentation section divides the image into a foreground and a background, and
   wherein, in segmentation process on the ith image, determines an area, resulting from summation of an area determined as the foreground in the processing target area and an area inside the processing target area, to be a foreground area in the ith image.

5. The image processing apparatus according to claim 1, wherein the images generated by the image generation section are images having lower resolutions than the image acquired by the image input section.

6. The image processing apparatus according to claim 1, wherein the detection target is a human face or a human body.

7. A segmentation method for extracting an area of a detection target from an image, comprising:
   an image input step of acquiring an image;
   an image generation step of generating a plurality of images with different resolutions from the image; and
   a segmentation step of performing segmentation, using the plurality of images with the different resolutions,
   wherein the segmentation section segments an image with a low resolution and then segmenting an image with a high resolution using a processing target area, and
   wherein the processing target area is only an area within a range of a predetermined number of pixels from a position in the image with the high resolution corresponding to an area near a boundary resulting from processing of the segmentation of the image with the low resolution, or only an area in the image with the high resolution corresponding to an area within a range of a predetermined number of pixels from the boundary resulting from the processing of segmentation of the image with the low resolution.

8. A non-transitory computer readable medium having a computer program stored therein, the program causing a computer to perform a segmentation method for extracting an area of a detection target from an image, comprising:
   an image input step of acquiring an image;
   an image generation step of generating a plurality of images with different resolutions from the image; and
   a segmentation step of performing segmentation, using the plurality of images with the different resolutions,
   wherein the segmentation section segments an image with a low resolution and then segmenting an image with a high resolution using a processing target area, and
   wherein the processing target area is only an area within a range of a predetermined number of pixels from a position in the image with the high resolution corresponding to an area near a boundary resulting from processing of the segmentation of the image with the low resolution, or only an area in the image with the high resolution corresponding to an area within a range of a predetermined number of pixels from the boundary resulting from the processing of segmentation of the image with the low resolution.

* * * * *